(12) United States Patent
Klapman et al.

(10) Patent No.: US 6,249,857 B1
(45) Date of Patent: Jun. 19, 2001

(54) APPARATUS USING A MULTIPLE INSTRUCTION REGISTER LOGARITHM BASED PROCESSOR

(75) Inventors: Matthew H. Klapman, Chicago; Jeffrey G. Toler, Algonquin, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/954,130

(22) Filed: Oct. 20, 1997

(51) Int. Cl.$^7$ ................................................ G06F 15/16
(52) U.S. Cl. ............................ 712/34; 712/36; 712/23
(58) Field of Search .................... 712/24, 23, 34–36; 708/517, 512, 499

(56) References Cited

U.S. PATENT DOCUMENTS

| | | | |
|---|---|---|---|
| 4,720,809 | * 1/1988 | Taylor | 708/512 |
| 4,852,038 | * 7/1989 | Wagner et al. | 708/517 |
| 5,097,434 | * 3/1992 | Stouraitis | 708/493 |
| 5,539,911 | * 7/1996 | Nguyen et al. | 712/23 |
| 5,553,012 | 9/1996 | Buss et al. | 708/277 |
| 5,570,310 | * 10/1996 | Smith | 708/517 |
| 5,574,942 | * 11/1996 | Colwell et al. | 712/23 |
| 5,642,305 | * 6/1997 | Pan et al. | 708/517 |
| 5,703,801 | * 12/1997 | Pan et al. | 708/517 |
| 5,920,596 | * 7/1999 | Pan et al. | 375/238 |
| 5,941,939 | * 8/1999 | Pan et al. | 708/499 |
| 5,948,052 | * 9/1999 | Toler | 708/517 |

OTHER PUBLICATIONS

Lewis et al.; Algorithm Design for a 30 bit Integrated Logarithmic Processor 1989.*
Stouraitis; A Hybrid Floating–Point/Logarithmic Number System Digital Signal Processor; 1989.*
Stouraitis; An Efficient VLSI Implementation of Logargarthmic Signal Processor; 1989.*
Das et al. ; Implementation of Four Common Functions on a LNS Co–processor; 1995.*
Huang et al. ; The Chip Design of A 32–b Logarithmic Number System; 1994.*
Melloit et al. ; ASAP–A 2D DFT VLSI Processor and Architecture; 1996.*
Lewis; 114MFLOPS Logarithmic Number System Arithmetic Unit for DSP Application; 1995.*
Stouraitis et al. ; Hybrid Signed Digit Logarithmic Number System Processor; 1993.*

* cited by examiner

Primary Examiner—Larry D. Donaghue

(57) ABSTRACT

In accordance with a first embodiment, a processing apparatus is provided. The processing apparatus (10) includes a register (12) including a first and a second programming instruction, a first processing unit (16) responsive to the first programming instruction, and a second processing unit (22) responsive to the second programming instruction. The second processing unit (22) includes a logarithm based processor having at least one digital logarithm converter (80), a digital logic device (82), and a digital inverse logarithm converter (84). In other embodiments, the processing apparatus (10) is incorporated into a communication device (100) and a video system (300).

9 Claims, 3 Drawing Sheets

APPARATUS USING A MULTIPLE INSTRUCTION REGISTER LOGARITHM BASED PROCESSOR

FIELD OF THE INVENTION

The present invention relates generally to apparatus that use a logarithm based processor.

BACKGROUND OF THE INVENTION

Many existing systems and apparatus use conventional digital processing devices to perform a wide variety of functions. For example, in communications applications, microprocessors are found in almost every available device, such as in cellular telephones, two-way radios, base stations, receivers, modems, satellites, telephone switches, and wireless transmission systems. In all of these applications, as processor speeds increase and memory becomes less expensive, new products incorporating faster processors using more memory are continually developed. Thus, a premium is placed on devices using the latest technology with the fastest processors using low power with reduced size and cost.

Accordingly, there is a need for improved apparatus for a variety of commercial applications, including communication applications, where the improved apparatus uses a low power, low cost processor with greatly increased processing speed.

BRIEF DESCRIPTION OF THE DRAWINGS

The invention is pointed out with particularity in the appended claims. However, other features of the invention may become more apparent and the invention may be better understood by referring to the following detailed description in conjunction with the accompanying drawings.

DETAILED DESCRIPTION OF THE PREFERRED EMBODIMENT(S)

In order to address the above described need, the present invention provides various types of apparatus using a logarithm based processor. Due to the increased processing speed and other advantages of the logarithm based processor, apparatus using a logarithm based processor can provide greater performance in a wide variety of applications.

In accordance with a first embodiment of the present invention, the apparatus includes a register including a first and a second programming instruction, a first processing unit responsive to the first programming instruction, and a second processing unit responsive to the second programming instruction. The second processing unit includes a logarithm based processor having at least one digital logarithm converter, a digital logic device, and a digital inverse logarithm converter.

In accordance with another embodiment, the apparatus is a communication device. The communication device includes a processing apparatus, a housing, and an amplifier responsive to the processing apparatus. The amplifier and the processing apparatus are disposed within the housing. The processing apparatus includes a register including a first and a second programming instruction, a first processing unit responsive to the first programming instruction, and a second processing unit responsive to the second programming instruction. The second processing unit includes a logarithm based processor having at least one digital logarithm converter, a digital logic device, and a digital inverse logarithm converter.

In accordance with another embodiment, the communication device includes an antenna, an analog to digital converter responsive to the antenna, and a processing apparatus responsive to the analog to digital converter. In this embodiment, the processing apparatus includes a multi-instruction register to store a plurality of programming instructions, a logarithm based processing unit including at least one of a digital logarithm- converter and an inverse logarithm converter, and at least one processing, unit responsive to the multi-instruction register.

In accordance with another embodiment, the apparatus is a video processing system. The video processing system includes a processing apparatus, a raster engine, a frame buffer, and a display device. The display device is responsive to the raster engine which is coupled to the frame buffer. The raster engine is responsive to the processing apparatus. The processing apparatus includes a multi-instruction register to store a plurality of programming instructions a logarithm based processing unit including at least one of a digital logarithm converter and an inverse logarithm converter, and at least one processing unit responsive to the multi-instruction register.

Figure 1:
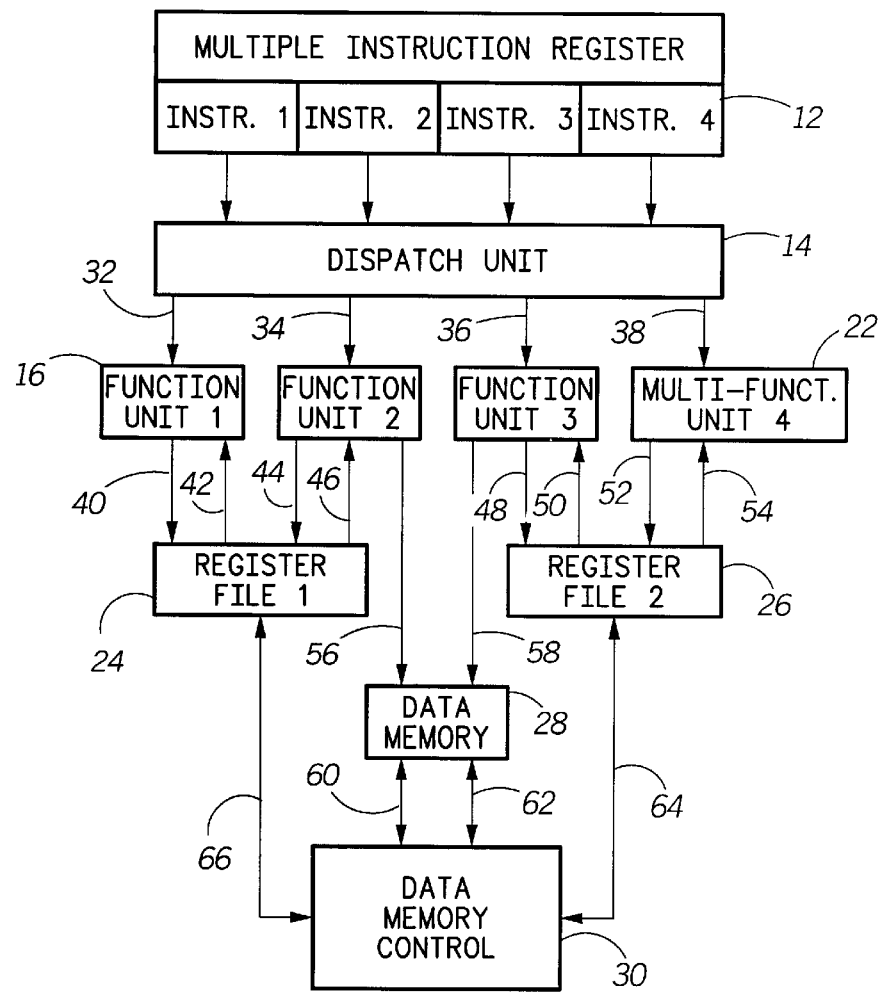
FIG. 1 is a block diagram of an embodiment of an apparatus in accordance with the present invention.

Referring to FIG. 1, an embodiment of an apparatus is illustrated. The apparatus 10 includes a multiple instruction register 12, a dispatch unit 14, at least one function unit 16, 18, 20, a multi-function unit 22, a first register file 24, a second register file 26, a memory 28, and a memory controller 30. The multiple instruction register 12 stores a plurality of execution instructions. The dispatch unit 14 routes each of the instructions, such as one or more of instructions 1–4 stored in register 12, to one or more of the function units 16, 18, 20, or 22 via multi-bit data busses 32, 34, 36, 38. The first and second function units 16, 18 are coupled to the first register file 24 by data busses 40, 42, 44, and 46, and the third and fourth function units 20, 22 are coupled to the second register file 26 via data busses 48, 50, 52, 54. The data memory controller 30 is in two-way communication with the first register file 24 via databus 66 and is in two-way communication with the second register file 26 via databus 64. Data memory controller 30 is also in communication with the second and third function units 18, 20 via data memory 28, In a particular embodiment, one or more of the function units 16, 18, and 20 may be implemented as an arithmetic processing unit, such as an arithmetic logic unit. The arithmetic processing unit may be configured to perform arithmetic operations, such as addition and subtraction. Other operations include multiplication, division, and exponentiation functions including, but not limited to, square root, inverse root, cubics, quartics, inverse cubics, inverse quartics, and trigonometric functions.

Multi-function unit 22 is preferably capable of performing at least two different operations. In a particular embodiment, the multi-function may be able to perform either multiplication or division operations. The particular operation selected depends on the instruction received from the dispatch unit 14. It is also preferred that the multi-function unit 22 perform either the multiplication or division operation in a single clock cycle. In this manner, the multi-function unit 22 can advantageously be used in a pipelined instruction type system.

An important feature of this multi-function unit is the smaller area of silicon required to implement multiplication and division. It is common for previous designs to have separate multiply and separate divide logic that take multiple cycles to compute. In this case, the same logic is used for the multiply and divide. Also, in a pipelined implementations it will only take a single cycle to perform a multiply or divide.

In another embodiment, at least one of the function units 16, 16, 20, or 22 performs an exponentiation operation. An exemplary function unit for performing exponentiation is the circuit described in U.S. Pat. No. 5,553,012, to Buss at al. The entire content of the above patent is incorporated by reference into this application.

Although the embodiment disclosed in FIG. 1 only shows a single multi-function unit 22, it is contemplated that the processing apparatus 10 may include one or more such function units. For example, all of the function units 16, is, 20 may be implemented as multi-function units, such as multi-function unit 22. In addition, although only four function units and only two register files are illustrated, it is contemplated that a larger or smaller number of function units or register files may be used depending upon the processing power and cost considerations of a particular application.

FIG. 1 is a very-long-instruction-word (VLIW) processor. Multiple parallel instructions reside in register 12. Register unit 12 depicts four instructions in parallel that will be dispatched in a single cycle, although any number of instructions can be in parallel depending upon the particular implementation. The dispatch unit 14 directs the instructions to the appropriate function unit 1–6, 18, 20 and 22. These function units execute the instructions and manipulate data accordingly from the instruction's specified register in register file 24 and 26. Some instructions may cause specific function units 16, 16, 20, or 22 to transfer data from the register files 24 and 26 to and from the data memory 28 as coordinated by data memory control 30. After a set of parallel instructions are executed, the process starts again with the next group of parallel instructions.

Figure 2:
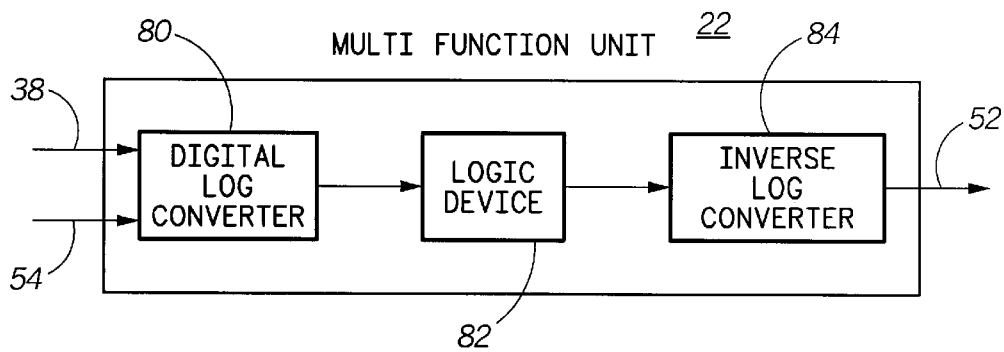
FIG. 2 is a block diagram of the multifunction unit of the apparatus of FIG. 1.

Referring to FIG. 2, a block diagram of a particular embodiment of the multi-function unit 22 is illustrated. Multi-function unit 22 includes a digital logarithm converter 80, at least one logic device 82, and an inverse logarithm converter 84. The digital logarithm converter 80 receives a first digital input signal 38 from dispatch unit 14 and a second digital input signal 54 from the register file 26.

A multiplication is performed by multi-function unit 22 in this manner: first, two values fed into digital log converter 80 via inputs 38 and 54 are converted from either integer or floating-point representation into the log domain via log converter 80. These resulting numbers are then added together in logic device 82. This sum is then sent to inverse log converter 84 to be converted back to the originating numerical format of integer or floating-point.

Division is performed in the same manner as multiplication, except that logic device 82 executes a subtraction instead of a summation.

Figure 3:
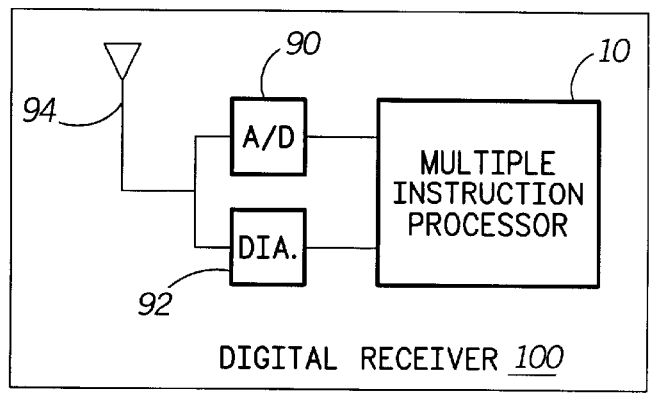
FIG. 3 is a block diagram of an embodiment of a communication device in accordance with the present invention.

Referring to FIG. 3, an embodiment of a communication device in accordance with the present invention is illustrated. The communication device includes a digital transceiver 100. The digital transceiver 100 includes an antenna 94, an analog to digital converter 90, a digital to analog converter 92, and a multiple instruction processor 10, such the multiple instruction processor 10 described in reference to FIGS. 1 and 2. The digital transceiver 100 may be incorporated into many wireless communication devices including without limitation a radio, a cordless phone, a base station, a satellite, a paging network, a television system, and a cellular phone.

Figure 4:
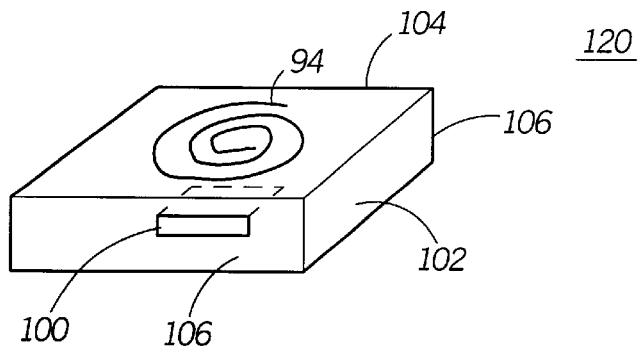
FIG. 4 is a perspective view of an embodiment of the communication device of FIG. 3.

Referring to FIG. 4, an embodiment of a package 120 for containing a communication device that includes the digital transceiver 100 is illustrated. In this embodiment, the package 120 is a three dimensional substantially rectangular device having at least one substantially planar surface 104 and a plurality of sides 106. Components, except for the antenna 94, of the digital transceiver 100 of FIG. 3 are disposed on the inside of the package 120. The antenna 94 is disposed on the surface 104. In one embodiment, the antenna 94 may be implemented as a substantially flat spiral inductive coil made of a conductive material, such as copper. The antenna 94 is preferably a semiconductor compatible antenna connected to the transceiver 100. The package 120 also includes a plurality of pin outs 102 for interfacing to other devices. Although not specifically shown, the pin outs 102 are connected to the transceiver 100 in a convention manner used in semiconductor packaging.

Since the antenna 94 is disposed on the surface 104 of the package 120, the antenna 94 is exposed to the atmosphere surrounding the package 120. In this arrangement, the antenna 94 advantageously serves a dual function of receiving and transmitting signals and a heat dissipation function, such as that performed by a heat sink connected to a computer processor. In addition, since the package 120 is integrated and is suitable for semiconductor manufacturing and packaging, the package 120 is of small size and low cost.

Figure 5:
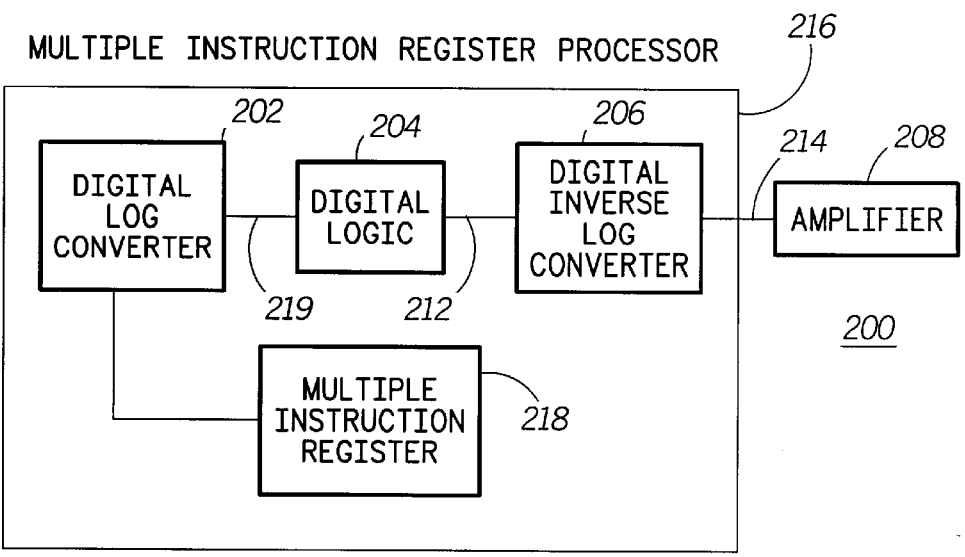
FIG. 5 is a block diagram of another embodiment of a communication device in accordance with the present invention.

Referring to FIG. 5, another embodiment of an apparatus 200 in accordance with the present invention is illustrated. The apparatus 200 includes a multiple instruction register logarithm based processor 216, such as the processor 10 described herein, and an amplifier 208. Be processor 216 is connected to the amplifier 208 by a communication link 214. In the preferred embodiment, the communication link 214 may be either a single electrically conductive connection, such as a copper wire, or may be a plurality of different electrically conductive connections. The multi-instruction logarithm based processor 216 includes a logarithm converter 202, a digital logic device 204, and an inverse logarithm converter 206. The digital logic device 204 is coupled to the logarithm converter 202 via a first digital connection 210 and is coupled to the inverse logarithm converter 206 via a second digital connection 212. The digital logic device 204 may be any known digital logic device, such as a register, a shifting device, a summer, a multiplexer, an and gate, an or gate, an exclusive or gate, an exclusive and gate, an inverter, a flip flop, a counter, arithmetic logic units, or any other digital circuit. The logarithm converter 202 and the inverse logarithm converter 206 may be any logarithm converter and inverse logarithm converter having good computation accuracy and high speed. An example of such logarithm and inverse logarithm converter devices may be found in U.S. Pat. No. 5,703,801, titled "Logarithm/Inverse-Logarithm Converter Utilizing Second-Order Term and Method of Using Same".

The apparatus 200 may be beneficially used in a large number of applications by appropriately programming the processor 216 to control the amplifier 208. For example, the processor 216 may be programmed to provide a pre-distortion signal over communication link 214 to the amplifier 208. Since the processor 216 is a high speed digital processor suitable for computing polynomial equations, the predistortion signal may be determined quickly enough to efficiently control the amplifier 208. The pre-distortion signal is preferably approximated using a polynomial function, such as a nonlinear polynomial function of the form $aX^i+bX+c$, where a, b, c are coefficients, X is an input variable, such as current or voltage, and i is an exponential. The multiple instruction register logarithm based processor 216 calculates certain terms in a polynomial equation, such as the term $X^i$, very quickly since a combination of low complexity high speed shifting and adding operations performed by the digital logic device 204 may be used instead of complex low speed floating point-multiplications. Although only a single exponential term and a single variable, X, was used for illustrated purposed, it is contemplated that processor 216 may calculate polynomials with a plurality of exponential terms and a plurality of variables.

A detailed example of a power amplifier apparatus using a logarithm based processor determining a predistortion signal based on a polynomial equation is illustrated in U.S. Pat. No. 5,920,596, titled "Apparatus for Amplifying a Signal Using a Digital Processor", the entire content of which has been incorporated by reference herein.

Figure 6:
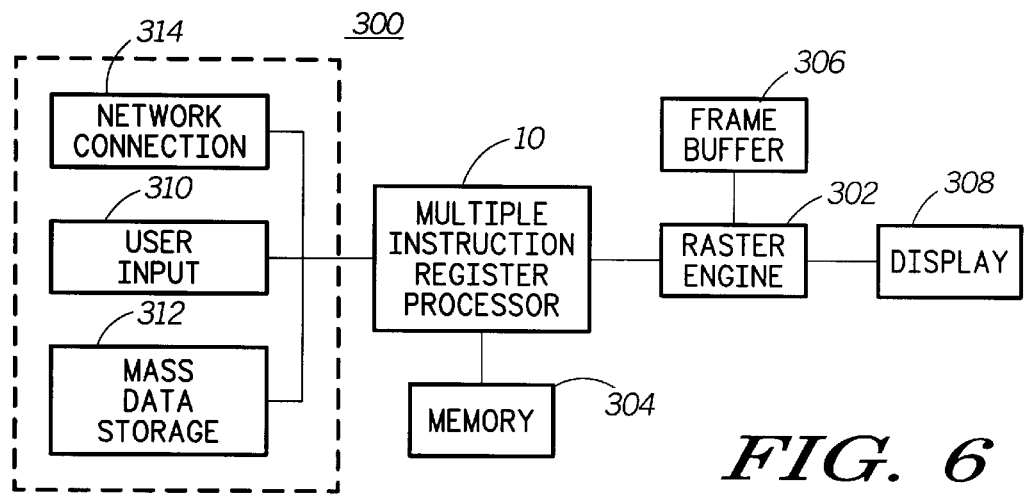
FIG. 6 is a block diagram of an embodiment of a video processing system in accordance with the present invention.

Referring to FIG. 6, an embodiment of a video system 300 is illustrated. The video system 300 includes a multiple instruction register processor 10, a raster engine 302, a memory 304, a frame buffer 306, and a display device 308. The video system 300 also may optionally include a user input device 310, such as a joystick or a mouse, a mass storage device 312, such as a computer readable disk drive or a compact disk drive, and a network connection 314, such as a modem or a wireless communication link. The multiple instruction register processor 10 may be implemented as described herein. The raster engine 302 is preferably a 3D type of raster engine, such as the Voodoo chip set available from 3DFX corp. The memory 304 is preferably random access memory and the frame buffer 306 is preferably high speed video memory. The display device 308 may be any suitable display device such as a computer monitor, a television, or a liquid crystal display.

Figure 7:
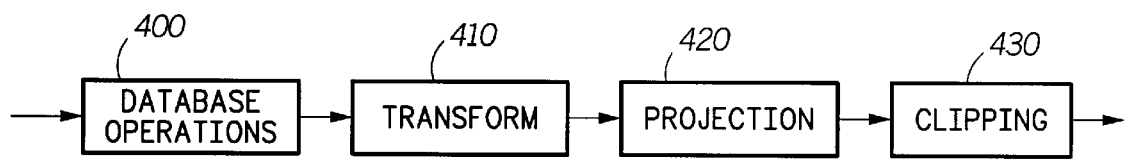
FIG. 7 is an example method executed by a raster engine, depicted as a 3-D graphics pipeline.

During operation, a program residing in memory 304 directs register 10 to transfer and collect data from input devices 310, 312, and 314. Based upon this transaction and the program in memory 304, register 10 is directed to execute a 3-D graphics pipeline up to the rasterization stage in raster engine 302. An example method executed-by the raster engine 302 is illustrated as a 3-D graphics pipeline flowchart, depicted in FIG. 7. This method consists of data base manipulations 400, geometric transforms 410 performed on the database, projection of the data from 3-D world coordinates onto screen-space 420, removal, or culling, of unneeded data 430. A last step is a final transfer of the polygons to raster engine 302 for drawing into frame Buffer 306 and final viewing on display 308.

Thus, there has been disclosed various embodiments of apparatus suitable for use in a wide variety of commercial applications, including communication and video applications, where the improved apparatus uses a low power, low cost multi-instruction processor with greatly increased processing speed.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A processing apparatus comprising:

a dispatch unit for generating a first digital input;

a register file for generating a second digital input;

a processing unit adapted to perform at least two arithmetic operations, the processing unit comprising at least one digital logarithm converter, a logic device, and an inverse logarithm converter;

the digital logarithm converter generating first and second log signals based upon the first and second digital inputs;

the logic device adding the first log to the second log signal to produce a first output signal; and the inverse logarithm converter performing an inverse logarithm operation on the first output signal to generate a second output signal, wherein the second output signal is sent to the register file.

2. The processing apparatus of claim 1, wherein the processing unit is configured to perform one of a division operation and a multiplication operation.

3. The processing apparatus of claim 1, wherein the processing unit is configured to perform an exponentiation operation.

4. The processing apparatus of claim 1, wherein the processing unit comprises an adder unit.

5. The processing apparatus of claim 1, further comprising a data memory controller responsive to the register file.

6. The apparatus of claim 1, wherein the logic device comprises one of a summer, a subtractor, a register, and a multiplexer.

7. The apparatus of claim 1, wherein the processor includes a plurality of logarithm converters.

8. A processing apparatus comprising:

a register for storing a first and a second programming instruction;

a first processing unit responsive to the register and responsive to the first instruction;

a digital logarithm converter responsive to the register and responsive to the second instruction to generate first and second log signals based upon the second instruction;

a logic device performing an arithmetic operation on the first log to the second log signals to produce an output; and an inverse logarithm converter performing an inverse logarithm operation on the output.

9. The processing apparatus of claim 8, wherein the first processing unit comprises one of an adder and a subtractor.

* * * * *